US011829297B2

United States Patent
Wan et al.

(10) Patent No.: US 11,829,297 B2
(45) Date of Patent: Nov. 28, 2023

(54) METHOD FOR ACCESSING CACHES IN CLUSTERED STORAGE SYSTEM, INVOLVES DETERMINING AND READING SECOND ADDRESS FROM SECOND ADDRESS ARRAY IN ACCORDANCE WITH REQUEST

(71) Applicant: Huawei Technologies Co., Ltd., Shenzhen (CN)

(72) Inventors: Li Wan, Hopkinton, MA (US); Lili Chen, Hopkinton, MA (US); Hongliang Tang, Hopkinton, MA (US); Ning Wu, Northborough, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 17/389,853

(22) Filed: Jul. 30, 2021

(65) Prior Publication Data

US 2021/0357333 A1 Nov. 18, 2021

Related U.S. Application Data

(63) Continuation of application No. PCT/CN2019/084133, filed on Apr. 24, 2019.

(60) Provisional application No. 62/799,557, filed on Jan. 31, 2019.

(51) Int. Cl.
*G06F 12/0893* (2016.01)
*G06F 13/28* (2006.01)
*G06F 15/173* (2006.01)

(52) U.S. Cl.
CPC .......... *G06F 12/0893* (2013.01); *G06F 13/28* (2013.01); *G06F 15/17331* (2013.01); *G06F 2212/608* (2013.01)

(58) Field of Classification Search
CPC ................. G06F 12/0893; G06F 13/28; G06F 15/17331; G06F 2212/608
See application file for complete search history.

(56) References Cited

U.S. PATENT DOCUMENTS

| | | | |
|---|---|---|---|
| 8,190,816 B2* | 5/2012 | Balasubramanian | ........................ G06F 3/0631 711/170 |
| 2012/0173818 A1 | 7/2012 | Martin | |
| 2015/0254003 A1 | 9/2015 | Lee et al. | |
| 2016/0313994 A1 | 10/2016 | Scott et al. | |
| 2017/0242799 A1 | 8/2017 | O'krafka et al. | |
| 2018/0285002 A1 | 10/2018 | Hayasaka et al. | |

FOREIGN PATENT DOCUMENTS

CN 103677670 A 3/2014

* cited by examiner

*Primary Examiner* — Tammara R Peyton
(74) *Attorney, Agent, or Firm* — Slater Matsil, LLP

(57) ABSTRACT

A clustered storage system includes a plurality of storage devices, each of which contributes a portion of its memory to form a global cache of the clustered storage system that is accessible by the plurality of storage devices. Cache metadata for accessing the global cache may be organized in a multi-layered structure. In one embodiment, multi-layered structure has a first layer first including a first address array, and the first address array include addresses pointing to a plurality of second address arrays in a second layer. Each second address array in the second layer includes addresses, each of which points to data that has been cached in the global cache.

26 Claims, 6 Drawing Sheets

METHOD FOR ACCESSING CACHES IN CLUSTERED STORAGE SYSTEM, INVOLVES DETERMINING AND READING SECOND ADDRESS FROM SECOND ADDRESS ARRAY IN ACCORDANCE WITH REQUEST

CROSS-REFERENCE TO RELATED APPLICATIONS

This application is a continuation of International Application No. PCT/CN2019/084133, filed on Apr. 24, 2019, which claims priority to U.S. Provisional Application 62/799,557, filed Jan. 31, 2019, and entitled "Method and Apparatus for Accessing Caches in Clustered Storage Systems," which is hereby incorporated by reference in its entirety.

TECHNICAL FIELD

The present disclosure relates generally to computer systems, and, in particular embodiments, to a system and method for accessing caches in clustered storage systems.

BACKGROUND

A clustered storage system generally includes multiple storage devices as cluster nodes. Each of the storage devices contributes a portion of its memory space to form a so called "global" memory of the clustered storage system. The global memory of the clustered storage system is accessible by every cluster node, and thus expands the memory space of each individual cluster node. The clustered storage system has flexibility to scale out the capacity of the global memory, e.g., by adding nodes in the clustered storage system.

SUMMARY

In accordance with one embodiment of the present disclosure, there is provided a method that includes receiving, by a first storage device in a storage cluster including a plurality of storage devices, a request for reading a data. The storage cluster has a cache memory accessible by the plurality of storage devices, and the cache memory includes a plurality of memories located in the respective plurality of storage devices. The method further includes locating a first address array upon receipt of the request, where the first address array includes one or more addresses; and determining a first address from the first address array in accordance with the request. The first address identifies a memory location of a second address array, and the second address array includes one or more memory addresses. The method also includes determining a second address from the second address array in accordance with request, where the second address identifies a memory location of the data that has been cached in the cache memory; and reading the data from the cache memory in accordance with the second address. By use of the first address array and the second address array, the method has an advantage of determines the memory location of the cached data faster, and is thus able to access the cached data faster. Further, less memory space is needed for storing the first address array and the second address array, which include cache metadata used for accessing the cached data.

In the above embodiment, the data may be cached in a portion of the cache memory that is located in the first storage device, and/or a second storage device different than the first storage device. The data may be read using remote direct memory access (RDMA) or direct memory access (DMA). The first address array and/or the second address array may be stored in the cache memory of the storage cluster. When remote direct memory access (RDMA) is used, the method only needs to perform three RDMA accesses to access the first address array, the second address array and the cached data, thus requiring less RDMA operations for accessing the memory of the storage cluster for reading the cached data.

The above method may include determining, by the first storage device, that the data has not been cached in the cache memory of the storage cluster upon determining that the first address array does not include the first address. The above method may also include determining, by the first storage device, that the data has not been cached in the cache memory of the storage cluster upon determining that the second address array does not include the second address. Accordingly, the method has advantages of determining whether a data is cached in the cache memory fasters based on the first and the second address arrays.

In accordance with another embodiment of the present disclosure, there is provided a method that includes receiving, by a first device in a storage cluster comprising a plurality of devices, a write I/O request for writing a data, where the storage cluster has a cache memory formed by a plurality of memories located in the respective plurality of devices, and the cache memory is accessible by the plurality of devices. The method further includes writing, by the first device, the data into the cache memory to cache the data. The method also includes adding, by the first device, a first address of the data in a first address array, where the first address identifies a memory location of the data cached in the cache memory. The first address array is locatable by a second address included in a second address array, and the second address identifies a memory location of the first address array. The method thus stores the memory location of the cached data using a layered structure.

In accordance with another embodiment of the present disclosure, there is provided a method that includes receiving, by a first storage device in a storage cluster including a plurality of storage devices, a request for reading a data, where the storage cluster includes a plurality of memories located in the respective plurality of storage devices, and the plurality of memories forming a cache memory of the storage cluster. The cache memory is accessible by the plurality of storage device. The method further includes determining a first memory address from a first set of cache metadata in accordance with the request, where the first set of cache metadata includes one or more memory addresses, and the first memory address identifies a memory location of a second set of cache metadata. The method also includes determining a second memory address from the second set of cache metadata in accordance with request, where the second set of cache metadata includes one or more memory addresses, and the second memory address identifies a memory location of the data that has been cached in the cache memory; and reading the data from the cache memory in accordance with the memory location of the data. By use of the first set of cache metadata and the second set of cache metadata, the method is able to determine the memory location of the cached data faster, and is thus able to access the cached data faster. Further, less memory space is needed for storing the first set of cache metadata and the second set of cache metadata, which include cache metadata used to the access the cached data. The method also has advantages of requiring less RDMA operations for accessing the cache memory of the storage cluster for reading the cached data. In this embodiment, the method may use three RDMA accesses for accessing the first set of cache metadata, the second set of cache metadata, and the cached data.

In accordance with another embodiment of the present disclosure, there is provided an apparatus for performing the above described embodiment methods. In accordance with another embodiment of the present disclosure, there is also provided a clustered storage system that includes a plurality of storage devices. Each of the plurality of storage devices is configured to perform above described embodiment methods.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
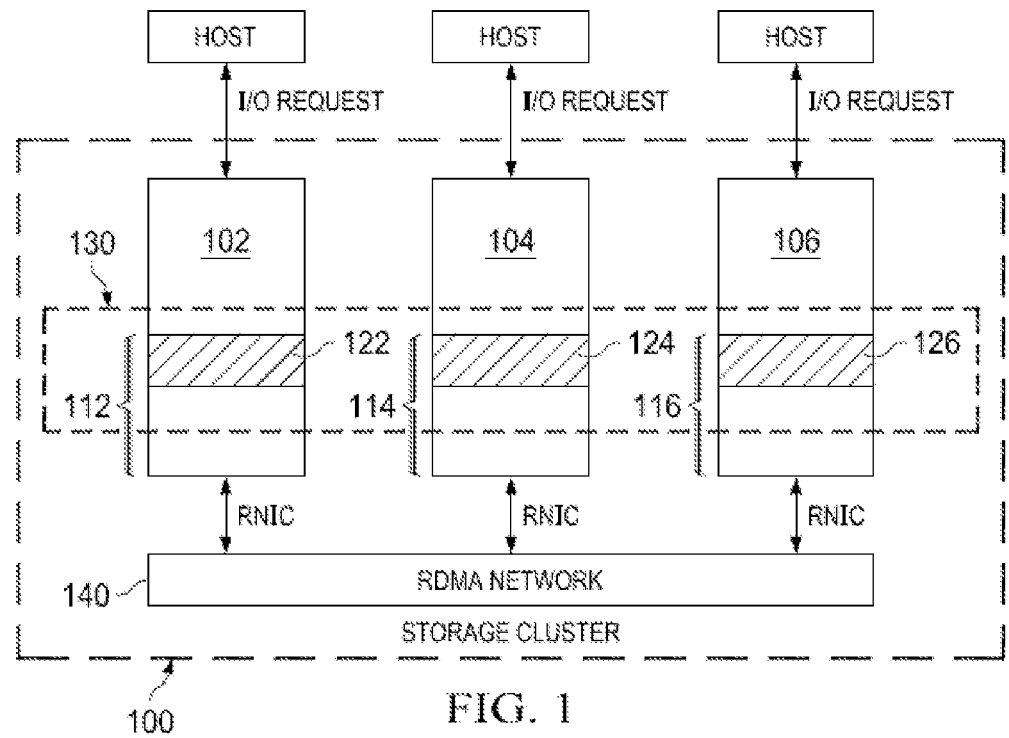
FIG. 1 illustrates a diagram of an embodiment storage cluster.

Embodiments of the present disclosure provide methods for accessing a global cache of a clustered storage system. The clustered storage system includes a plurality of storage devices, each of which contributes a portion of its memory to form the global cache of the clustered storage system. Thus, the global cache of the clustered storage system is distributed among the plurality of storage devices, but is accessible by each of the plurality of storage devices. In some embodiments, a multi-layered structure may be used to organize cache metadata for accessing data cached in the global cache. Each layer may include information of addresses pointing to a next layer, and the last layer, i.e., the bottom layer, may include memory addresses locating data that has been cached in the global cache. The multi-layered structure may include various numbers of layers, which may be configurable.

According to some embodiments, a first layer in the multi-layered structure may include an address array, which may include addresses representing the address space of the global cache. Each of the addresses of the first layer is used to locate a node in the second layer. Each node in the second layer points to a portion (e.g., a set of cache pages) of the global cache that has cached data. Each node includes an address array, and the address array includes a set of addresses pointing to, respectively, the set of cache pages. When a cache page has data cached in the cache page, the address of the cache page is included in the address array of a node in the second layer. Otherwise, when the cache page does not have cached data, the address of the cache page will not be included in the address array of the node in the second layer. When a node in the second layer points to (i.e., includes an address that points to) at least one cache page that has cached data, the address array in the first layer includes an address for locating the node of the second layer. Otherwise, when none of the cache pages pointed by the node has cached data, the address array in the first layer does not need to include the address for locating the node of the second layer. With the cache metadata organized in the multi-layered structure, cached data in the global cache may be accessed with a faster speed and reduced number of remote direct memory access (RDMA) operations, and less memory space may be needed for storing the cache metadata. Detailed description will be provided in the following.

A clustered storage system typically includes a plurality of storage devices as cluster nodes, each of which contributes a portion of its memory space to form a so called "global" memory of the clustered storage system. In other words, the global memory of the clustered storage system is distributed among the cluster nodes. The global memory of the clustered storage system is accessible by every cluster node. A cluster node may access distributed memories from any other cluster nodes.

When accessing data across different nodes in a clustered storage system, read and write access to data may go through an indirection layer, i.e., a cache layer, in order to improve overall system performance by exploring spatial and temporal localities. The global memory of the clustered storage system as described above may be used as a global cache memory (or a global cache) of the clustered storage system, and is used by the cluster nodes for caching data. The cache layer in the clustered storage system may thus be referred to as a "globally" accessible cache layer. Data to be written into a main storage device may be temporarily stored in the global cache. Data may also be read directly from a global cache if the data has been cached in the global cache. Since the access speed of a cache memory is usually higher than main storage device, caching significantly improves the read/write performance of the clustered storage system.

Various methods have been used to implement a globally accessible cache layer for accessing a global cache in a clustered storage system. For example, accessing of the distributed memories may be performed through a remote direct memory access (RDMA) network. RDMA is a technique that allows direct memory access from a memory of one computer device into that of another computer device without involving either one's operating system, or processor. This permits high-throughput, low-latency networking. In a clustered storage system, a cluster node may access the distributed memories from any other cluster nodes with a global unique linear virtual address. Metadata and data may be placed in the distributed memories and accessed through RDMA operations. Every access to the distributed memories other than from the originator goes to the RDMA network.

Different cache metadata may be created to reference the caches. Cache metadata may refer to a set of data used to describe or index cache memories. Cached data is thus able to be located in the cache memories by use of the cache metadata. For example, in an asymmetric logical unit access (ALUA) type of storage system, cache metadata may be organized by a certain type of hash tables. Using hash tables is a common practice for a storage system to reference cache pages. A hash value may be calculated for each piece of cached data and saved in a hash table, and the cached data is identified and retrieved by referencing the hash table. In this example, hash values are cache metadata used to access cached data, and organized using a hash table. However, this cache metadata structure is not generally friendly for accessing a global cache. For example, a hash table is not linearly aligned, because two contiguous data blocks may be hashed to two non-contiguous buckets. Further, conflicts may be inevitable due to a limit size of a hash table, and this may result in reduced efficiency of hashing cached data.

In another example, direct mapping may be used to map physical addresses of caches to cached data. The mapping relationship (which is cache metadata) may be saved in memories. However, this may require a large amount of memory space to store the mapping relationship, and space efficiency is a major concern when using this approach for accessing caches. As an illustrative example, in a storage system with an 8 PB memory space used as a cache memory, if each cache page store 8k data (that is, each cache page has a memory size of 8k), 8 TB total memories may be required to store cache metadata referencing the cache pages. Cache may be generally organized as cache pages. Each cache page may have a memory size, e.g., 4k, 8k, or 256k. Each cache page may be identified using a memory address. Contiguous cache pages have contiguous memory addresses.

Embodiments of the present disclosure provide methods and apparatus for accessing a global cache of a clustered storage system (or a storage cluster), where cache metadata is organized in a multi-layered cache metadata structure, and used for locating cached data in the global cache. RDMA may be used to access cached data across clustered nodes. Throughout the disclosure, the terms of "clustered storage system" and "storage cluster" are used interchangeably, and the terms of "cache" and "cache memory" are used interchangeably.

FIG. 1 illustrates a diagram of an embodiment storage cluster 100. The storage cluster 100 includes cluster nodes 102, 104, and 106. Each of the cluster nodes 102, 104, and 106 may be a storage device, a computer device, or a server. The cluster nodes 102, 104, and 106 may be connected to respective hosts, which send input/output (I/O) requests to the respective cluster nodes for reading or writing data. While FIG. 1 illustrates three cluster nodes in the storage cluster 100, any number of cluster modes may be applicable. For example, the storage cluster 100 may include 2, 5, or 25 cluster nodes. The cluster nodes 102, 104, and 106 include a physical memory 112, 114, 116, respectively. The memory of each cluster node may be a dynamic random access memory (DRAM). Each of the cluster nodes 102, 104, and 106 may include a RDMA network interface card (RNIC), and configured to access memory of a different cluster node through a RDMA network 140.

As shown, each of the cluster nodes 102, 104, and 106 contributes a portion of its memory space, i.e., 122, 124 and 126, respectively, to form a single logical cache memory space 130 for the storage cluster 100. In other words, the single logical cache memory space 130 is distributed among the cluster nodes 102, 104, and 106, and includes distributed memories 122, 124 and 126. The single logical cache memory space 130 is accessible by any cluster node of the storage cluster 100. The single logical cache memory space 130 may also be referred to as a global cache memory or a global cache. A portion of memory space contributed by a cluster node may have various sizes, e.g., 8 GB, 16 GB, or 32 GB. The portions of memory space 122, 124 and 126 may have the same size or different sizes.

As an illustrative example, when a cluster node, e.g., the cluster node 102, receives an I/O request for reading data, the cluster node 102 may first check whether the data has been cached in the global cache 130. If the data has been cached, cluster node 102 may read the data from the global cache 130. Because the global cache 130 is distributed among the cluster nodes 102, 104, 106, the cached data may be located in any of the distributed memories 122, 124, 126. If the cached data is located in the cluster node 102, i.e., in the distributed memory 122, the cluster node 102 may read the cached data locally, e.g., using direct memory access (DMA). As one example, one or more cache pages storing the data may be located in the distributed memory 122. If the cached data is located in a different cluster node, e.g., the distributed memory 124 of the cluster node 104, the cluster node 102 may use RDMA to access (i.e., read) the cached data, i.e., through the RDMA network 140. As one example, one or more cache pages storing the data may be located in the distributed memory 124.

Similarly, when the cluster node 102 receives an I/O request for writing data, the cluster node 102 may write the data into the global cache 130. If a cache page of the global cache 130, to which data is to be written, is located locally, i.e., in the cluster node 102, the cluster node 102 may write the data locally, e.g., using DMA. If the cache page is located in a different cluster node, e.g., the cluster node 104, the cluster node 102 may use RDMA to write the data into the cache page, i.e., through the RDMA network 140.

In some embodiments, a multi-layered structure may be used to organize cache metadata for accessing the global cache 130 of the storage cluster 100. Each layer may include information of addresses pointing to a next layer, and the last layer, i.e., the bottom layer, may include physical addresses pointing to the actual cached data. The multi-layered structure may include two layers, three layers, or any number of layers, and may be re-configured to provide different numbers of layers, which provides flexibility to scale the cache metadata structure. In this way, each layer may be located or identified by a previous layer using linear access, which improves speed to access cached data. With the cache metadata organized in the multi-layered structure, cached data may be accessed with a faster speed and reduced number of RDMA operations, and less memory space will be needed for storing the cache metadata.

Figure 2:
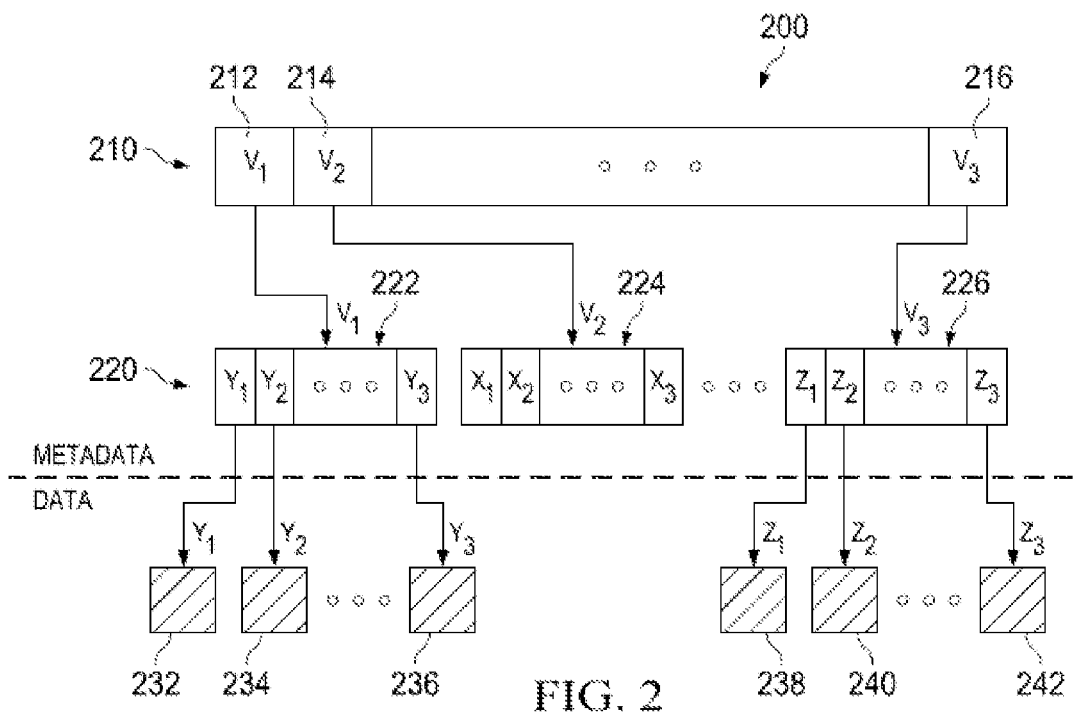
FIG. 2 illustrates a diagram of an embodiment two-layered cache metadata structure.

FIG. 2 illustrates a diagram of an embodiment two-layered cache metadata structure 200. The cache metadata structure 200 may be used by a clustered storage system, e.g., the storage cluster 100, to access cached data in a global cache. In this example, cache metadata used to locate cached data in a global cache, e.g., the global cache 130, is organized in two layers, i.e., a first layer 210 and a second layer 220. The two layers form a cache layer for the clustered storage system.

The first layer 210 is an indirection layer. The first layer 210 includes cache metadata pointing to the second layer 220. The first layer 210 may be represented by a linear address array including entries. The linear address array represents a contiguous address space of the logical cache memory space used in a clustered storage system, e.g., the global cache 130 of the storage cluster 100. Each entry, e.g., 212, 214, . . . , 216, in the linear array of the indirection layer has an address (i.e., memory address) pointing to the second layer 220 or a Null value. In this disclosure, the terms of "memory address" and "address" are used interchangeably.

The second layer 220 is a leaf layer. The second layer 220 includes a plurality of leaf nodes 222, 224, ..., 226. Each leaf node includes cache metadata pointing to cache pages storing cached data. Each leaf node may be represented by an address array including entries. Each entry in the address array of a leaf node has an address (i.e., memory address) pointing to a cache page that stores cached data or has a Null value. A cache page storing cached data may be referred to as a cache data page throughout the present disclosure. For example, as shown, the leaf node 222 has entries pointing to cache data pages 232, 234, ..., 236, and the leaf node 226 has entries pointing to cache data pages 238, 240, ... 242. When a cache page storing cached data is reclaimed, a corresponding entry of a leaf node pointing to the cache page will have a Null value. A leaf node only exists when its entries point to at least one cache data page. When all the cache pages pointed by a leaf node are flushed, the leaf node may be reclaimed by the clustered storage system. In this case, the entry in the first layer 210 pointing to the reclaimed leaf node will have a Null value. Thus, the second layer 220 may be thin.

In some embodiments, to construct the two-layered cache metadata structure 200, a global cache of the clustered storage system may be divided into a plurality of groups of cache pages, e.g., N groups. Each group of cache pages corresponds to one leaf node. Accordingly, the second layer 220 has N leaf nodes, and each leaf node points to a group of cache pages. The linear array in the first layer 210 may include N entries corresponding to the N groups, and each entry has an address (i.e., an entry value) identifying one of the N groups, i.e., N leaf nodes. That is, each entry in the first layer has an address indicating the memory location of a leaf node, consequently, memory location of cache metadata of a corresponding leaf node. A memory location as used herein refers to a location in a memory of a storage cluster. The memory may be a global cache memory of the storage cluster. The memory may be a memory of a cluster node (or a local memory of the cluster node). The memory may also be a global memory of the storage cluster not used as cache. If one leaf node is reclaimed, i.e., none of the cache pages pointed by the leaf node has data, the entry in the first layer pointing to the leaf node may be empty or Null (i.e., does not have a value). If data is then saved in at least one cache page of the reclaimed leaf node, the entry in the first layer corresponding to the leaf node will be filled with the address of the leaf node. Thus, cache metadata in the first layer includes the N entries, which need to be saved in memory, and used for locating leaf nodes in the second layer.

Each of the N leaf nodes may correspond to the same number of cache pages or different numbers of cache pages. An address array representing a leaf node in the second layer 220 may include M entries corresponding to M cache pages. The M entries include memory addresses indicating memory locations of the M cache pages. An entry is filled with a physical address of a cache page when the cache page has data cached. Otherwise, if a cache page of the M cache pages does not have cached data, the entry in the address array corresponding to the cache page will be Null or empty. If new data is cached in this cache page later, a physical address of this cache page will be filled in the corresponding entry of the address array of the leaf node. Thus, cache metadata in the second layer includes M×N entries, which need to be saved in memory, and used for locating cache data pages in the global cache.

Table 1 below shows an example address array. The address array includes 5 entries, having entry values V1-V5, respectively.

TABLE 1

| Entry value | V1 | V2 | V3 | V4 | V5 |
|---|---|---|---|---|---|

Table 1 above may be used to represent the linear array (also referred to generally as an address array) for the first layer 210. In this case, Table 1 may include 5 entries, and each entry has an entry value of an address, i.e., V1-V5, respectively, pointing to a leaf node (i.e., indicating a memory location of the leaf node). When Table 1 above is used to represent the address array for the second layer 220, Table 1 may include 5 entries, and each entry has an entry value of a physical address indicating a cache page (i.e., a memory address of the cache page).

Table 2 below shows another example address array, which includes entries, having entry values V1-V3, Null and V5, respectively.

TABLE 2

| Entry value | V1 | V2 | V3 | Null | V5 |
|---|---|---|---|---|---|

When Table 2 is used to represent the address array for the first layer 210, it points to four leaf nodes with memory addresses of V1, V2, V3 and V5. When Table 2 is used to represent the address array for the second layer 220, it points to four cache pages having cached data, with memory addresses of V1, V2, V3 and V5.

The cache metadata in the first and the second layers may be saved in a metadata region of the clustered storage system. The metadata region may be located in one of the plurality of cluster nodes of the clustered storage system. Other cluster nodes who want to access the cache metadata may do so using RDMA. The metadata region may also be located in a global memory space, such as a global cache of a storage cluster. In this case, the cache metadata may be stored in different cluster nodes of the storage cluster. In one embodiment, each cluster nodes may store a copy of the cache metadata, and access the cache metadata locally when needed.

Referring back to FIG. 2, the entries 212, 214, 216 of the address array in the first layer 210 have entry values of V1, V2, V3, respectively. Each of the entry values is an address that identifies a memory location of metadata of a leaf node in the second layer 220 corresponding to the entry. For example, V1 is an address of the leaf node 222, and shows where cache metadata of the leaf node 222 is stored. Similarly, V2 is an address of the leaf node 224, where cache metadata of the leaf node 224 is stored, and V3 is an address of the leaf node 226, where cache metadata of the leaf node 226 is stored. As an illustrative example, entries of the leaf node 222 have entry values of Y1, Y2, ... Y3, respectively. Y1, Y2, Y3 are addresses of the cache data page 232, 234, and 236, respectively. Thus, the first layer corresponds to a first set of cache metadata, i.e., entries 212, 214, ... 216, corresponding to the plurality of leaf nodes 222, 224, ..., 226. Each of the first set of cache metadata identifies a location of a second set of metadata, i.e., a leaf node, or has a Null value. Each of the second set of metadata identifies a cache data page, e.g., the cache data page 232, or has a Null value. The first set of metadata and the second set of metadata may also be stored in the global cache. Thus, the global cache may be used to store data and metadata.

As an illustrative example of a two-layered cache metadata structure, the first layer may represent a contiguous logical block address space of the global cache of the storage cluster. Each entry of the first layer may be a pointer pointing to the second layer which further points to cache pages storing cached data. Each entry of the first layer may have an address pointing to one of the N groups of cache pages. Thus, there are N leaf nodes. In a case where each cache page is 8 KB and each leaf node includes 1k entries, each leaf node (consequently, a corresponding entry in the first layer) points to a 1k*8 KB memory (i.e., 8 MB memory). In such a case, for example, a first entry in the first layer points to 0-8 MB cache pages (i.e., a first leaf node) of the global cache, a second entry in the first layer points to 8-16 MB cache pages (i.e., a second leaf node) of the global cache, and a third entry in the first layer points to 16 MB-32 MB cache pages (i.e., a third leaf node) of the global cache, etc. When an I/O request is received, an entry in the first layer may be determined first, which points to a leaf node in the second layer, and then an entry in the leaf node pointed by the entry in the first layer may be determined. The entry in the leaf node identifies a cache page with cached data in response to the I/O request. In some embodiments, offsets may be used to determine entries in the first layer and the second layers. For example, if the I/O request has a first offset of 16 MB for the first layer, then the third entry in the first layer (pointing to 16 MB-32 MB cache pages) may be located. When the third entry in the first layer is located, the third leaf node in the second layer (corresponding to the third entry of the first layer) is thus located. Since each entry in the second layer points to an 8 KB cache page, if the I/O request has a second offset of 24 KB for the second layer, a fourth entry (a first entry points to 0-8 KB, a second entry points to 8-16 KB, a third entry points to 16-24 KB, the fourth entry points to 24-32 KB, etc.) in the third leaf node may be located. Thus, the cache page pointed by the fourth entry in the third leaf node may be determined and the cached data may then be retrieved. If a cache page pointed by a leaf node does not exist, i.e., no data has been cached in the cache page, an entry of a leaf node pointing to the cache page is Null. Those of ordinary skill in the art would recognize that various mechanisms or methods may be used to determine (or locate) entries in the multi-layered metadata structure in response to an I/O request.

When an entry in the first layer determined based on the first offset is Null, which means that the requested data has not cached, then there is no need to locate and access the second layer metadata. When an entry in the second layer determined based on the second offset is Null, this means that requested data is not cached. If all the entries of a leaf node are Null, then this leaf node is reclaimed, i.e., cache pages pointed by the leaf node are cleaned and become available for caching new data. Accordingly, an entry in the first layer pointing to this leaf node is updated to be Null. Thus, a cluster node may determine whether or not requested data has been cached based on whether an entry in the first layer, or an entry in the second layer, is Null.

In one example, when a cluster node receives an I/O request for reading data, the cache layer may be first consulted to determine whether the data has been cached in the global cache. The cluster node may locate the cache metadata of the first layer, and then locate an entry of the first layer. In one example, the I/O request may include a device TD and an offset, which are used to identify the location of the first layer cache metadata. The cluster node may then determine an entry in the cache metadata of the first layer based on the request (e.g., an offset). If the entry is empty or Null, it means there is no cached data page existing, i.e., the data is not cached. If the entry points to a leaf node, i.e., the entry has an address identifying a memory location of the leaf node, the cluster node locates the cache metadata of the leaf node, and determines an entry of the leaf node (e.g., based on an offset), and consequently, determines an address of a cache page that stores the data. If the leaf node points to valid cache data pages, operations on these cache data page are allowed.

In another example, when a cluster node receives an I/O request for writing data, the cluster node may first write the data to the global cache. The data may be written into a cache page of the global cache. An address of the cache page may then be used as a value of an entry of a leaf node in the second layer. For example, the entry previously had a Null value, which is overwritten by the address of the cache page). If the entry is the first entry that has a value not Null, i.e., the leaf node did not exist previously, then, an entry in the first layer corresponding to the leaf node will be filled with an address indicating memory location of the leaf node.

Figure 3:
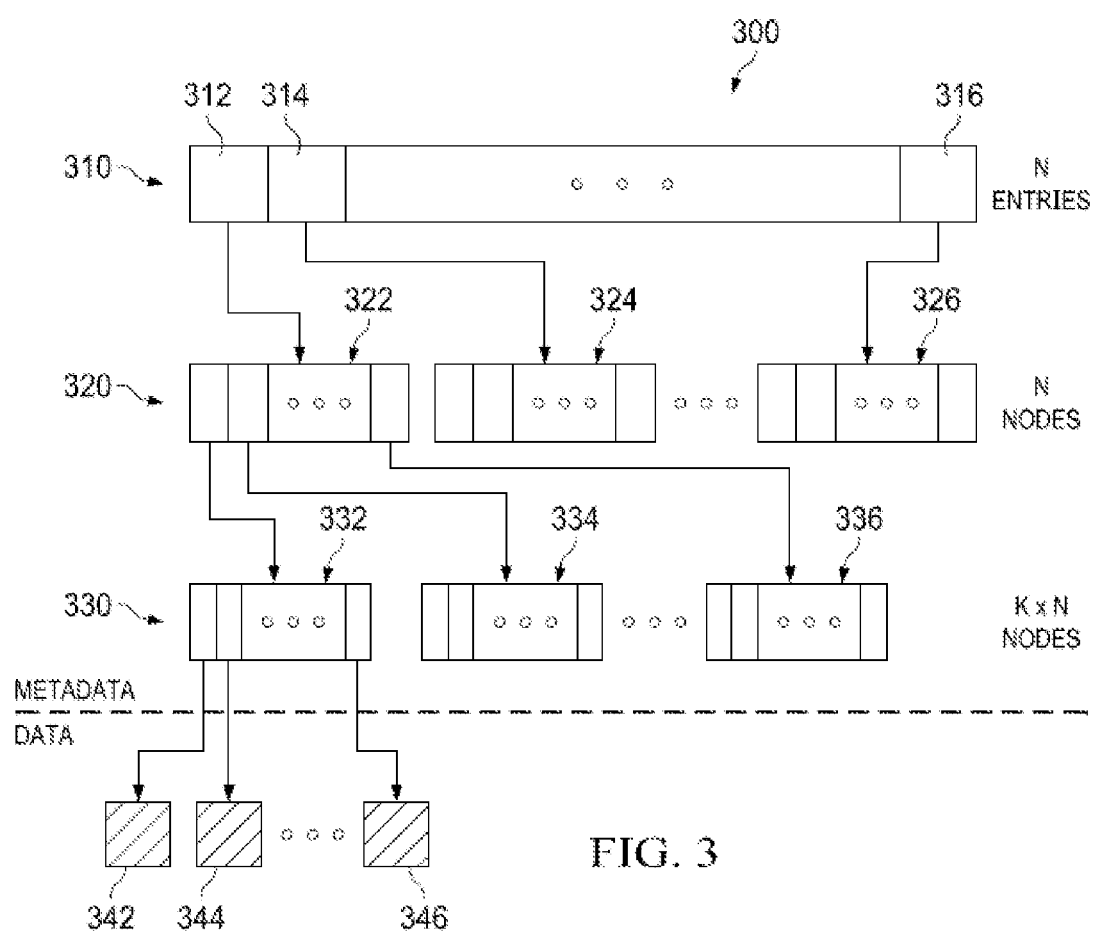
FIG. 3 illustrates a diagram of an embodiment three-layered cache metadata structure.

FIC. 2 shows that cache metadata of a storage cluster is organized using a two-layer structure. In some embodiments, a multi-layer structure with more than two layers, e.g., 3-layer, or 4-layer, may also be used to organize cache metadata of a storage cluster. other FIG. 3 illustrates a diagram of an embodiment three-layered cache metadata structure 300. Those of ordinary skill in the art would recognize that other number of layered structure for organizing the global cache may be built similarly without departing from the spirit and principle of the present disclosure. The cache metadata structure 300 may be used by a clustered storage system, e.g., the storage cluster 100, to access cached data in a global cache, e.g., the global cache 130. In this example, cache metadata used to locate cached data in the global cache is organized in three layers, i.e., a first layer 310, a second layer 320, and a third layer 330. The three layers form a cache layer for the clustered storage system. The first layer 310 and the second layer 320 are indirection layer. The third layer 320 is a leaf layer.

The first layer 310 includes cache metadata representing the logical cache memory space used in a clustered storage system, e.g., the logical cache memory space 130 of the storage cluster 100. The first layer may be represented by an address array (e.g., a linear array) including entries. Each entry, e.g., 312, 314, . . . , 316, in the linear array of the indirection layer has an address pointing to the second layer 320, or has a Null value.

The second layer 320 includes a plurality of branch nodes 322, 324, . . . , 326. Each of the branch nodes 322, 324, . . . , 326 includes cache metadata pointing to the third layer 330. Each branch node may be represented by an address array that includes a plurality of entries. Each entry has an address pointing to the third layer 330.

The third layer 330 is similar to the second layer 220 in FIG. 2. The third layer 320 includes a plurality of leaf nodes 332, 334, . . . , 336. Each leaf node is represented by an address array. Each entry in the address array of a leaf node points to a cache data page. For example, as shown, the leaf node 332 has entries pointing to cache data pages 342, 344, . . . , 346.

As shown in FIG. 3, each entry of the first layer 310 points to a branch node of the second layer 320, and each entry of a branch node points to a leaf node of the third layer 330. Each entry of a leaf node in the third layer points to a cache page. A leaf node only exists when its entries point to at least one cache data page. When all the cache pages pointed by a leaf node are flushed, the leaf node may be reclaimed by the clustered storage system. If one leaf node is reclaimed, i.e., none of the cache pages pointed by the leaf node has data, an entry in the second layer corresponding to the leaf node may be empty i.e., does not have a value or has a Null value (not shown). If new data is saved in at least one cache page of the reclaimed leaf node, the entry corresponding to the leaf node in the second layer will be filled with the address of the leaf node. When a branch node has all entries empty, an entry in the first layer corresponding to the branch node will be empty (has a Null value).

In some embodiments, to construct a three-layered cache metadata structure, a global cache of the clustered storage system may be divided into a plurality of groups of cache pages, e.g., N groups. Each group of cache pages corresponds to one branch node. Accordingly, the second layer 320 has N branch nodes (e.g., branch nodes 322-326). The linear array in the first layer 310 may include N entries (e.g., entries 312-316) corresponding to the N groups, and each entry has an address (i.e., an entry value) identifying (locating) one of the N branch nodes. Thus, cache metadata in the first layer includes the N entries, which need to be saved in memory, and used for locating branch nodes in the second layer.

Each of the N groups (i.e., N branch nodes) in the second layer may be further divided into K sub-groups of cache pages, and each sub-group corresponds to a leaf node. Accordingly, each branch node (e.g., branch node 322) points to K leaf nodes (e.g., leaf nodes 332-336) in the third layer 330. Each branch node in the second layer has an address array including K entries. Each of the K entry points to one leaf node in the third layer. Thus, cache metadata in the second layer includes K×N entries, which will be saved in memory and used for locating the leaf nodes. Each branch node may have different numbers of entries, i.e., may point to different numbers of leaf nodes.

There are K×N leaf nodes in the third layer 330. Each of the K×N leaf nodes may correspond to the same number of cache pages, or different numbers of cache pages. An address array for a leaf node in the third layer 330 may include M entries corresponding to M cache data pages. An entry is filled with a physical address of a cache page when the cache page has data cached. Otherwise, if a cache page of the M cache pages does not have cached data, the entry in the address array corresponding to the cache page will be empty. If new data is cached in this cache page later, physical address of this cache page will be filled in the corresponding entry of the address array. Thus, cache metadata in the third layer includes M×K×N entries, which need to be saved in memory, and used for locating cache data pages in the global cache. One of ordinary skill in the art would recognize that cache metadata may be organized in a multi-layered structure having more than three layers in a similar way as illustrated in FIG. 3.

Figure 4:
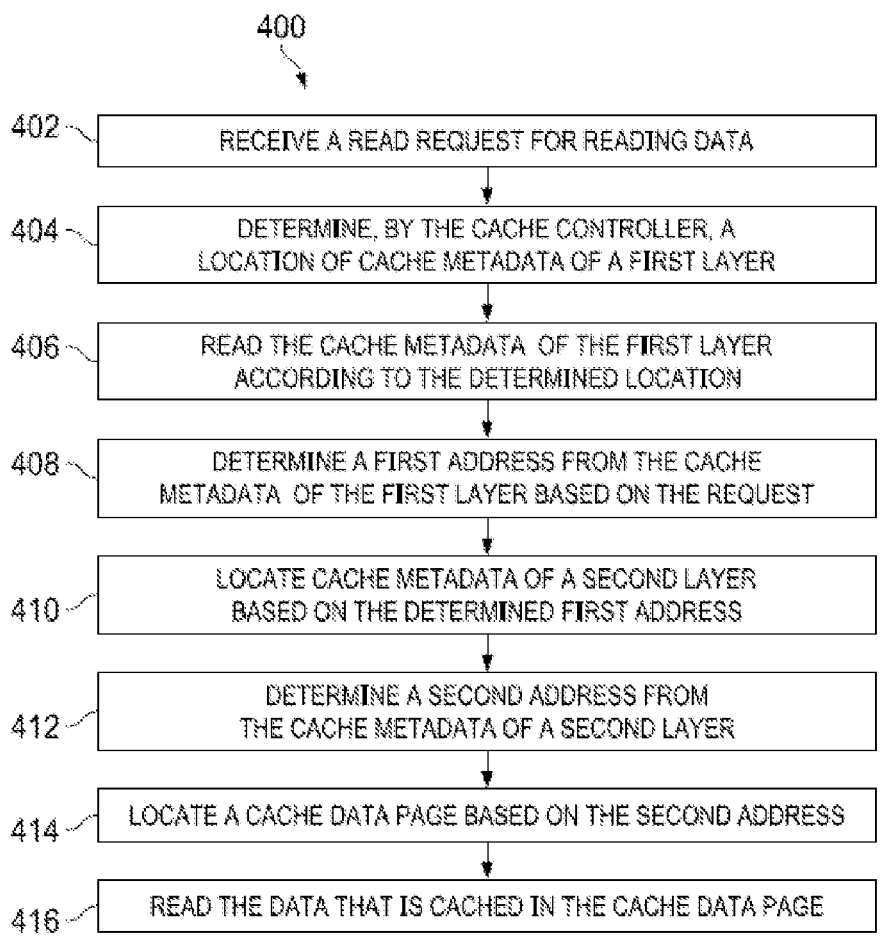
FIG. 4 illustrates a flowchart of an embodiment method for accessing data in a storage cluster.

FIG. 4 illustrates a flowchart of an embodiment method 400 for accessing data in a storage cluster. The method 400 may be performed by a cluster node in the storage cluster. In this example, cache metadata is organized in two layers, as illustrated in FIG. 2, and RDMA is used to access memories across cluster nodes. At step 402, the cluster node receives a read request for reading data. The read request may then be sent to a cache controller (or storage controller), and the cache controller may determine location of the data in a global cache of the storage cluster if the data is cached. At step 404, the cluster node determines, by the cache controller, a location of cache metadata of a first layer. For example, the cluster node may determine the location according to a device ID (devid) and an offset (similar to the first offset as described above used to determine an entry in the first layer) to the devid. In this case, each cluster node may own a set of first layer cache metadata that can be located using a devid of the corresponding cluster node, and the offset is used to determine an entry in the first layer. When all cluster nodes use one set of first layer cache metadata, the offset may need to be pre-processed so that the same offset for different cluster nodes (i.e., different devid) points to different entries in the first layer. The cache metadata of the first layer includes a first set of addresses. At step 406, the cluster node reads the first layer cache metadata, i.e., the first set of addresses, according to the determined location. At step 408, the cluster node determines a first address from the cache metadata of the first layer based on the request. That is, the cluster node determines (or selects) the first address from the first set of addresses. If the cluster node cannot find the first address, which indicates that the data is not cached, the method 400 stops. At step 410, the cluster node locates cache metadata of a second layer based on the determined first address. The cache metadata of the second layer includes a second set of addresses. The second set of addresses points to a set of cache pages storing cached data. At step 412, the cluster node determines a second address from the cache metadata of the second layer. That is, the cluster node determines (or selects) the second address from the second set of addresses. At step 414, the cluster node locates a cache data page based on the second address. At step 416, the method reads the data that is cached in the cache data page. In this example, the cluster node performs 3 RDMA accesses, i.e., the method 400 accesses the cache metadata of the first layer, accesses the cache metadata of the second layer, and reads the data from the cache data page.

Figure 5:
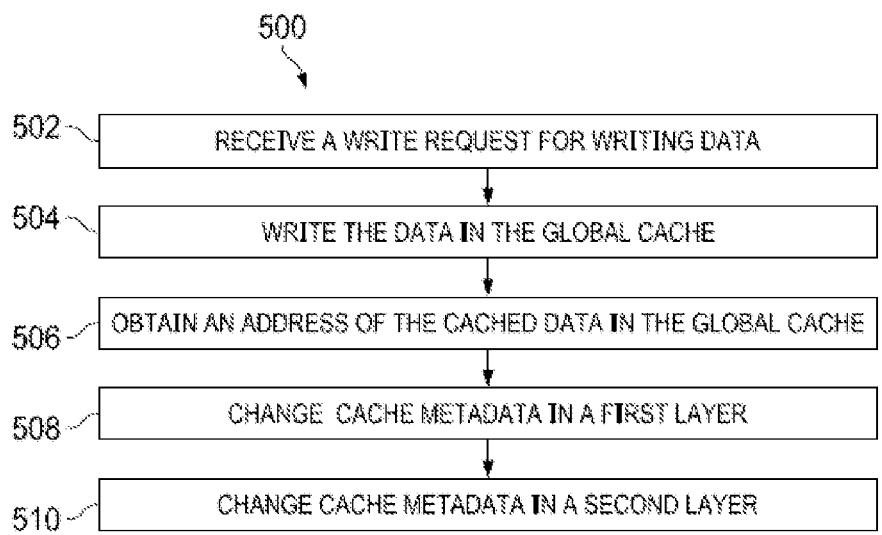
FIG. 5 illustrates a flowchart of another embodiment method for accessing data in a storage cluster.

FIG. 5 illustrates a flowchart of an embodiment method 500 for accessing data in a storage cluster. The method 500 may be performed by a cluster node in the storage cluster. In this example, cache metadata is organized in two layers, as illustrated in FIG. 2. At step 502, the cluster node receives a write request for writing data. The write request may then be sent to a cache controller (or storage controller), and cache controller may write the data in a global cache of the storage cluster, and generate cache metadata for locating the cached data. At step 504, the cluster node writes the data in the global cache. At step 506, the cluster node obtains an address of the cached data in the global cache. The address identifies a cache page in the global cache that stores the data. At step 508, the cluster node changes cache metadata in a first layer. This is the case when a leaf node pointing to the cache page in a second layer does not exist. An entry in the first layer corresponding to the leaf node will be filled with an address pointing to the leaf node. If the leaf node pointing to the cache page has exited, this step may be skipped. At step 510, the cluster node changes cache metadata in the second layer. That is, an entry corresponding to the cache page is filled with a physical address of the cache page where the data is cached. In this example, the method 500 performs 3 RDMA accesses, i.e., the cluster node writes data to the cache page, changes the cache metadata of the first layer, and changes the cache metadata of the second layer.

The embodiment methods have advantages of requiring less memory space to store cache metadata and requiring less RDMA accesses for accessing a global cache of a clustered storage system. As an illustrative example, a storage cluster has 8 PB memory capacity, and each cache page stores 8K data. In a case where direct mapping is used to reference cached data, 1T of entries may be required to index the cache metadata referencing the cached data in the 8 PB memory. In contrast, the embodiment methods, e.g., when a two-layered cache metadata structure is used, need 1G of entries for the first layer. The second layer is added when there are cache data pages pointed by the first layer. Thus, the second layer metadata size is bounded by sizes of caches that storing data, not the storage size of the storage cluster. In another example, when hash tables are used to organize cache metadata, and the hash tales keeps an address for each 8K user data, a request for accessing 8M data (continuous) requires reading 1K times of cache metadata. In contrast, the embodiment methods, e.g., when a two-layered cache metadata structure is used, need 1 time read of cache metadata in the first layer, and 1 time read of cache metadata in second layer, i.e., only 2 times access to the cache metadata. Moreover, as discussed above, a cluster node may determine whether or not requested data has been cached based on whether an entry in a layer is Null (i.e., has a value of Null). If an entry in a layer (e.g., layer 1 or 2) is Null, then the cluster node does not need to continue to check the cache metadata in other layers lower than the layer (e.g., layer 2 or 3). The cluster node is thus able to determine whether requested data has been cached faster, and avoid wasting time checking all cache metadata of the global cache.

Figure 6:
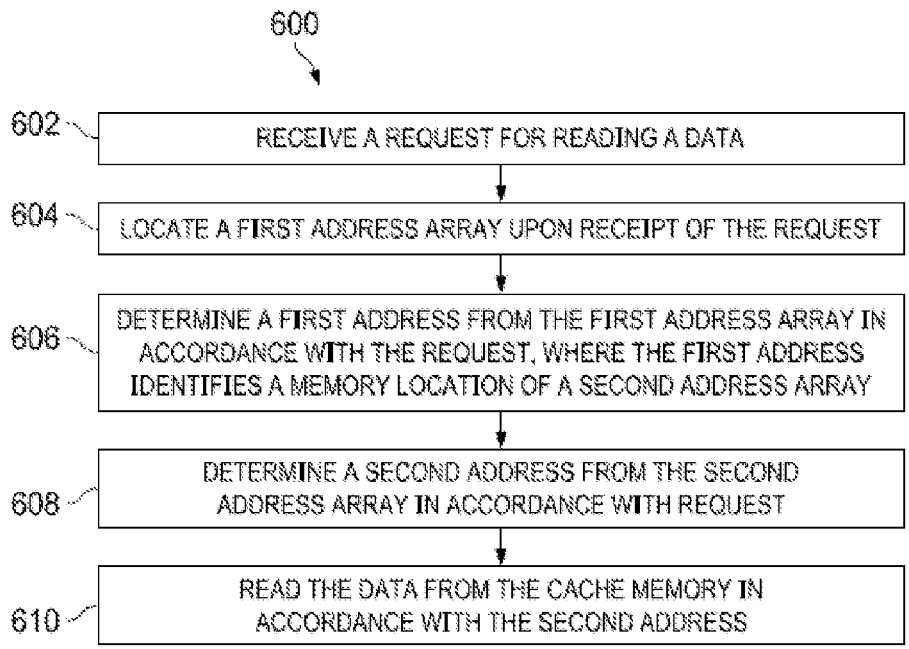
FIG. 6 illustrates a flowchart of an embodiment method for accessing data in a storage cluster.

FIG. 6 illustrates a flowchart of an embodiment method 600 for accessing data in a storage cluster including a plurality of storage devices. The method 600 may be performed by a storage device of the storage cluster. As shown, at step 602, the storage device receives a request for reading a data. The storage cluster has a cache memory accessible by the plurality of storage devices, and the cache memory includes a plurality of memories located in the respective plurality of storage devices. At step 604, the storage device locates a first address array upon receipt of the request. The first address array includes one or more addresses. At step 606, the storage device determines a first address from the first address array in accordance with the request, where the first address identifies a memory location of a second address array. The second address array includes one or more memory addresses. At step 608, the storage device determines a second address from the second address array in accordance with request. The second address identifies a memory location of the data that has been cached in the cache memory. At step 610, the storage device reads the data from the cache memory in accordance with the second address.

Figure 7:
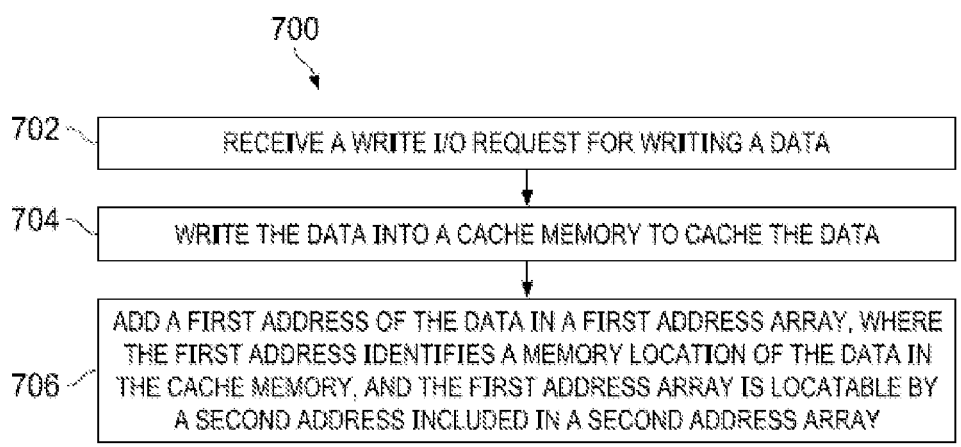
FIG. 7 illustrates a flowchart of another embodiment method for accessing data in a storage cluster.

FIG. 7 illustrates a flowchart of an embodiment method 700 for accessing data in a storage cluster including a plurality of storage devices. The method 700 may be performed by a storage device of the storage cluster. As shown, at step 702, the storage device receives a write I/O request for writing a data. The storage cluster has a cache memory formed by a plurality of memories located in the respective plurality of devices, and the cache memory is accessible by the plurality of devices. At step 704, the storage device writes the data into the cache memory to cache the data. At step 706, the storage device adds a first address of the data in a first address array, where the first address identifies a memory location of the data in the cache memory, and the first address array is locatable by a second address included in a second address array. The second address identifies a memory location of the first address array.

Figure 8:
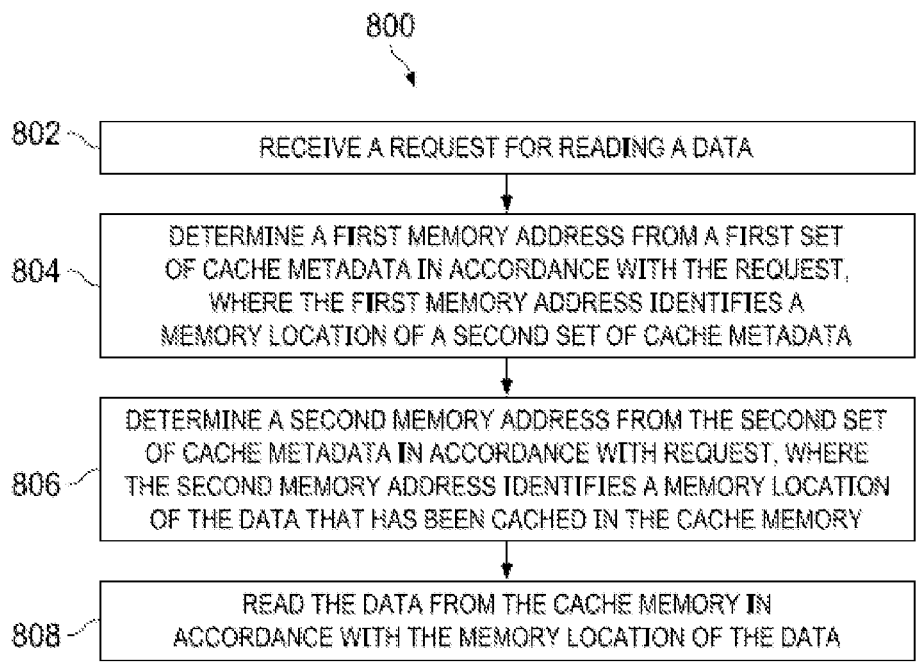
FIG. 8 illustrates a flowchart of another embodiment method for accessing data in a storage cluster.

FIG. 8 illustrates a flowchart of an embodiment method 800 for accessing data in a storage cluster including a plurality of storage devices. The method 800 may be performed by a storage device of the storage cluster. As shown, at step 802, the storage device receives a request for reading a data. The storage cluster includes a plurality of memories located in the respective plurality of storage devices, and the plurality of memories forms a cache memory of the storage cluster. The cache memory is accessible by the plurality of storage device. At step 804, the storage device determines a first memory address from a first set of cache metadata in accordance with the request, where the first memory address identifies a memory location of a second set of cache metadata. The first set of cache metadata includes one or more memory addresses. At step 806, the storage device determines a second memory address from the second set of cache metadata in accordance with request, where the second memory address identifies a memory location of the data that has been cached in the cache memory. The second set of cache metadata includes one or more memory addresses. At step 808, the storage device reads the data from the cache memory in accordance with the memory location of the data.

Figure 9:
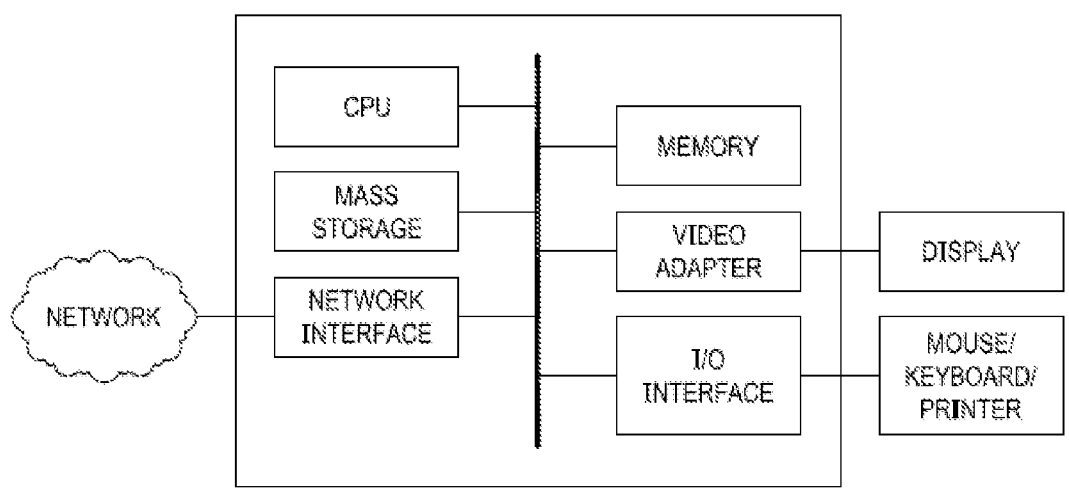
FIG. 9 illustrates a diagram of an embodiment computing platform.

FIG. 9 illustrates an embodiment computing platform that may be used for implementing, for example, the devices and methods described herein, in accordance with an embodiment. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 10:
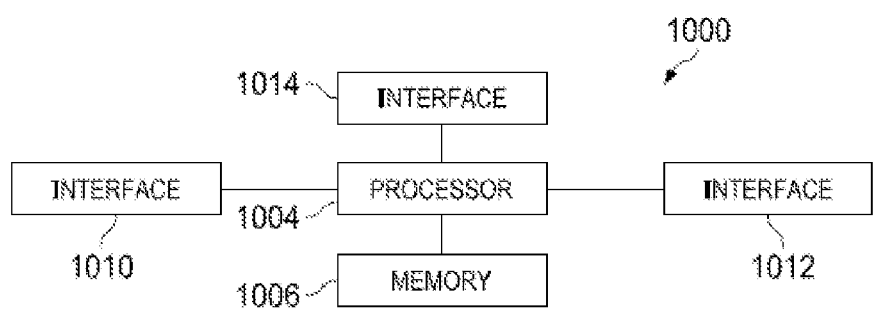
FIG. 10 illustrates a block diagram of an embodiment processing system.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system woo is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
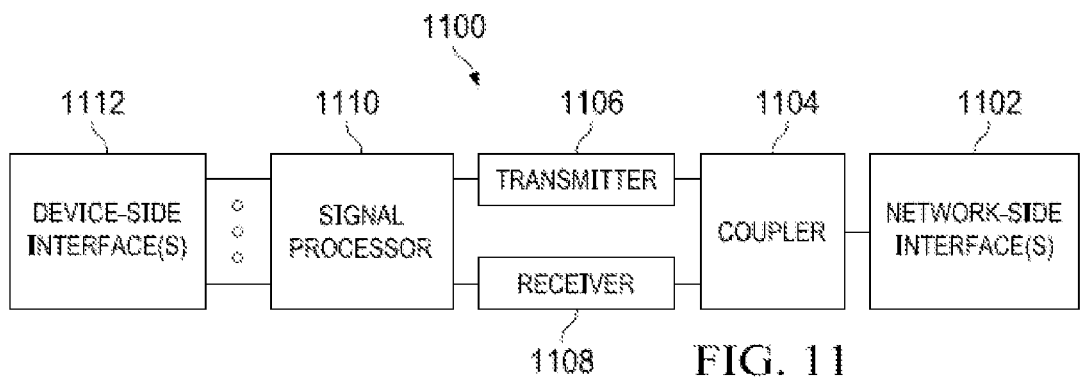
FIG. 11 illustrates a block diagram of a transceiver.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 106 may include any component or collection of components (e.g., up-converter, power amplifier, etc.) adapted to convert a baseband signal into a modulated carrier signal suitable for transmission over the network-side interface 1102. The receiver 108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a locating unit/module, a determining unit/module, a reading unit/module, a writing unit/module, an accessing unit/module, a caching unit/module, a storing unit/module, an adding unit/module, and/or a setting unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method, comprising:
   receiving, by a first storage device, a request for reading data cached in a cache memory, the first storage device being in a storage cluster having the cache memory accessible by a plurality of storage devices, the cache memory including memories located in the each of the plurality of storage devices;
   locating, by the first storage device, a first address array upon receipt of the request, the first address array including one or more addresses;

determining, by the first storage device, a first address from the first address array in accordance with the request, the first address identifying a memory location of a second address array that includes one or more memory addresses;

determining, by the first storage device, a second address from the second address array in accordance with request, the second address identifying a memory location of the data in the cached memory; and reading, by the first storage device, the data from the cache memory in accordance with the second address.

2. The method of claim 1, wherein the data has been cached in a portion of the cache memory that is located in a second storage device that is different than the first storage device.

3. The method of claim 1, wherein the data is read from the cache memory using remote direct memory access (RDMA).

4. The method of claim 1, wherein the data has been cached in a portion of the cache memory that is located in the first storage device.

5. The method of claim 1, wherein the data is read from the cache memory using direct memory access (DMA).

6. The method of claim 1, further comprising:
accessing, by the first storage device, the first address array using remote direct memory access (RDMA).

7. The method of claim 1, further comprising:
accessing, by the first storage device, the second address array using remote direct memory access (RDMA).

8. The method of claim 1, wherein the data has been cached in a portion of the cache memory located in at least two storage devices.

9. The method of claim 1, wherein the first address array is stored in the cache memory.

10. The method of claim 1, wherein the second address array is stored in the cache memory.

11. The method of claim 1, further comprising:
determining, by the first storage device based on the request, whether the first address array comprises the first address.

12. The method of claim 11, further comprising:
determining, by the first storage device, that the data has not been cached in the cache memory of the storage cluster upon determining that the first address array does not comprise the first address.

13. The method of claim 1, further comprising:
determining, by the first storage device based on the request, whether the second address array comprises the second address.

14. The method of claim 13, further comprising:
determining, by the first storage device, that the data has not been cached in the cache memory of the storage cluster upon determining that the second address array does not comprise the second address.

15. A first storage device comprising:
a processor, and
a non-transitory computer readable storage medium storing programming for execution by the processor, the programming including instructions to:
receive a request for reading data cached in a cache memory, the first storage device being in a storage cluster having the cache memory accessible by a plurality of storage devices, the cache memory including memories located in the each of the plurality of storage devices;

locate a first address array upon receipt of the request, the first address array including one or more addresses;

determine a first address from the first address array in accordance with the request, the first address identifying a memory location of a second address array that includes one or more memory addresses;

determine a second address from the second address array in accordance with request, the second address identifying a memory location of the data in the cached memory; and read the data from the cache memory in accordance with the second address.

16. A method comprising:
receiving, by a first device, a write I/O request for writing a data, the first device being in a storage cluster having a cache memory accessible by a plurality of devices, the cache memory including memories located in the each of the plurality of devices;

writing, by the first device, the data into the cache memory to cache the data; and adding, by the first device, a first address of the data in a first address array, the first address identifying a memory location of the data in the cache memory, wherein the first address array is locatable by a second address in a second address array, the second address identifying a memory location of the first address array.

17. The method of claim 16, further comprising:
adding, by the first device, the second address identifying the memory location of the first address array in the second address array.

18. The method of claim 16, wherein the data is written in a portion of the cache memory that is located in a second device that is different than the first device.

19. The method of claim 18, wherein the data is written into the cache memory using remote direct memory access (RDMA).

20. The method of claim 16, wherein the data is written in a portion of the cache memory that is located in the first device.

21. The method of claim 20, wherein the data is written into the cache memory using direct memory access (DMA).

22. The method of claim 16, wherein the first address array is accessed using remote direct memory access (RDMA).

23. The method of claim 16, wherein the second address array is accessed using remote direct memory access (RDMA).

24. The method of claim 16, wherein the first address array is stored in the cache memory.

25. The method of claim 16, wherein the second address array is stored in the cache memory.

26. The method of claim 16, wherein the data is cached in a portion of the cache memory located in at least two devices of the storage cluster.

* * * * *